Dec. 5, 1967    R. B. McFIGGANS    3,355,916
COMBINATION LOCK DEVICE
Filed June 18, 1965    6 Sheets-Sheet 1

INVENTOR
ROBERT B. McFIGGANS

BY *Charles J. Nickey*

ATTORNEY

Dec. 5, 1967 R. B. McFIGGANS 3,355,916
COMBINATION LOCK DEVICE
Filed June 18, 1965 6 Sheets-Sheet 4

INVENTOR
ROBERT B. McFIGGANS
BY
Charles J. Fickey
ATTORNEY

Dec. 5, 1967  R. B. McFIGGANS  3,355,916
COMBINATION LOCK DEVICE
Filed June 18, 1965  6 Sheets-Sheet 5
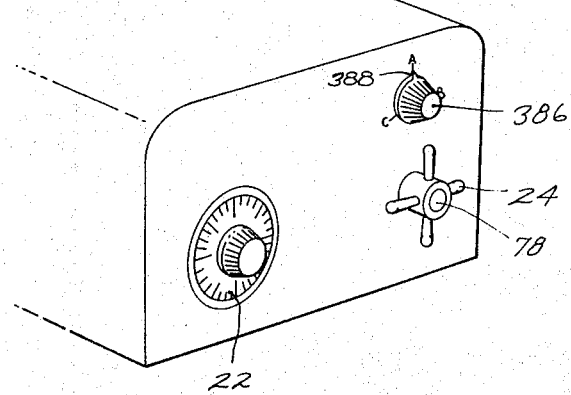
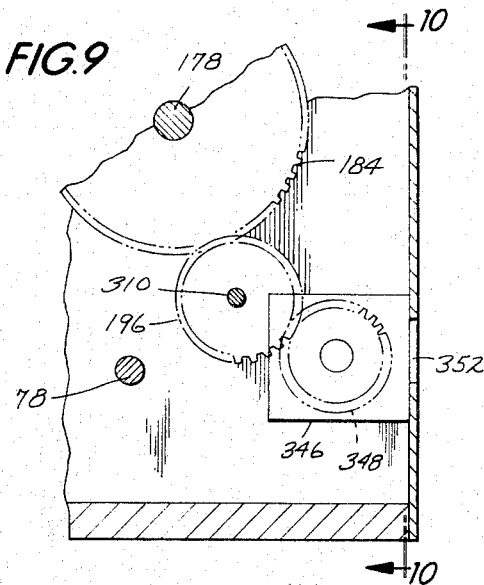
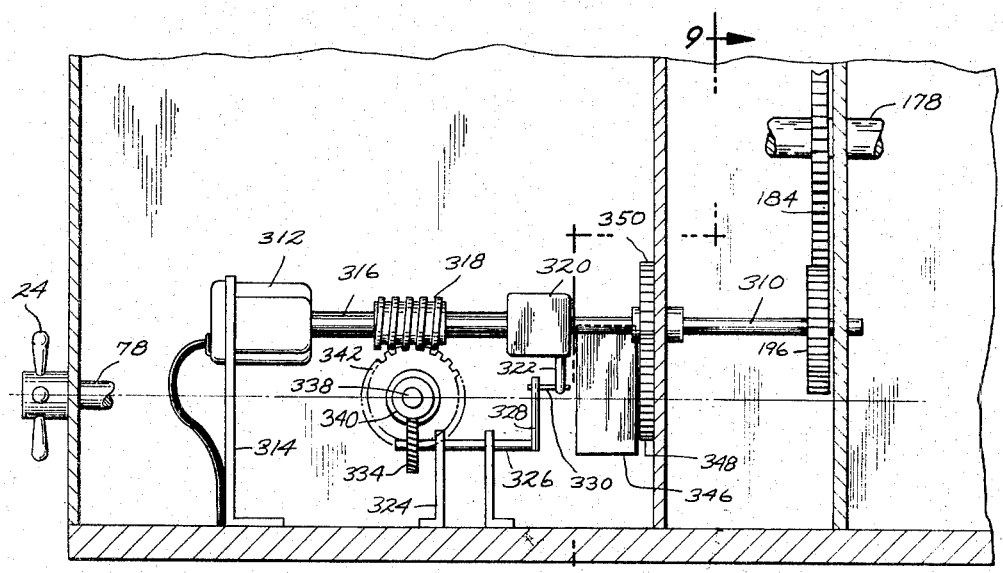
INVENTOR
ROBERT B. McFIGGANS
BY Charles J. Tickey
ATTORNEY INVENTOR
ROBERT B. McFIGGANS
BY Charles J. Hickey
ATTORNEY

3,355,916
COMBINATION LOCK DEVICE
Robert B. McFiggans, Stamford, Conn., assignor to
Pitney-Bowes, Inc., Stamford, Conn., a corporation of
Delaware
Filed June 18, 1965, Ser. No. 464,911
17 Claims. (Cl. 70—314)

ABSTRACT OF THE DISCLOSURE

The specification pertains to improvements in combination locks of the type disclosed in U.S. Patent No. 3,034,329, issued May 15, 1962, to Robert G. Pitney et al. for "Combination-Lock Device." The lock disclosed in U.S. Patent 3,034,329 is provided with means for altering the correct combination each time the lock is unlocked and relocked, with the combination being altered in accordance with a predetermined random pattern. In the patented device the means for altering the correct combination is connected to and operated by an actuating member that serves to relock the lock. This invention involves elimination of the operative interconnection between the actuating members and the means for altering the correct combination, and provision and means for operating the means for altering the combination independently of the actuating member and without having to unlock the lock.

---

This invention relates to combination locks and more particularly to combination locks of the kind involving means for altering the correct combination according to a predetermined random pattern.

The primary object of the present invention is to provide new and improved combination lock systems based upon the invention described and claimed in U.S. Patent No. 3,034,329, issued May 15, 1962, to Robert G. Pitney and Alva G. Russell for "Combination-Lock Device." The particular apparatus illustrated and described in said patent involves a unique combination lock with means for altering the correct combination each time the lock is unlocked and relocked, with the alteration being in accordance with a predetermined random pattern. The particular embodiment described by the patent takes the form of a postage metering machine incorporating a register and an actuating member adapted to be locked by the new combination lock, with unlocking of the combination lock permitting operation of the actuating member to effect the following functions: (a) relocking the lock, (b) altering the correct combination according to a predetermined random pattern, and (c) resetting the register by a predetermined amount. The aforesaid lock includes a tumbler assembly made up a plurality of adjustable tumblers, a like plurality of differential units adapted to be driven to adjust said tumblers individually so as to alter the correct combination, and a variable output mechanism operatively interconnecting the differential units and the actuating member and adapted to drive said units by variable amounts according to the aforementioned random pattern each time actuating movement of the actuating member is effected. The specific embodiments of the invention hereinafter described depart from the teachings of U.S. Patent No. 3,034,329 by eliminating operative interconnection between the variable output mechanism and the actuating member. This elimination makes possible a wide variety of applications requiring control of actuating members by combination locks whose correct combinations may be altered in a random manner whether or not the actuating member is operated.

Accordingly, a more specific object of the invention is to provide a system having a combination lock for controlling operation of an actuating member and means for altering the tumbler settings of said lock according to a predetermined random pattern without unlocking the lock or operating said actuating member.

Another specific object is to provide apparatus having one or more actuating members controlled by combination locks whose combination can be adjusted according to a predetermined random pattern by means whose operability is determined independently of some or all of said actuating members. As more fully described hereinafter, the combination may be changed under manual or automatic control.

Other objects and many of the attendant advantages of the present invention will become more readily apparent from the following detailed specification when considered together with the accompanying drawings, wherein.

Figure 1:
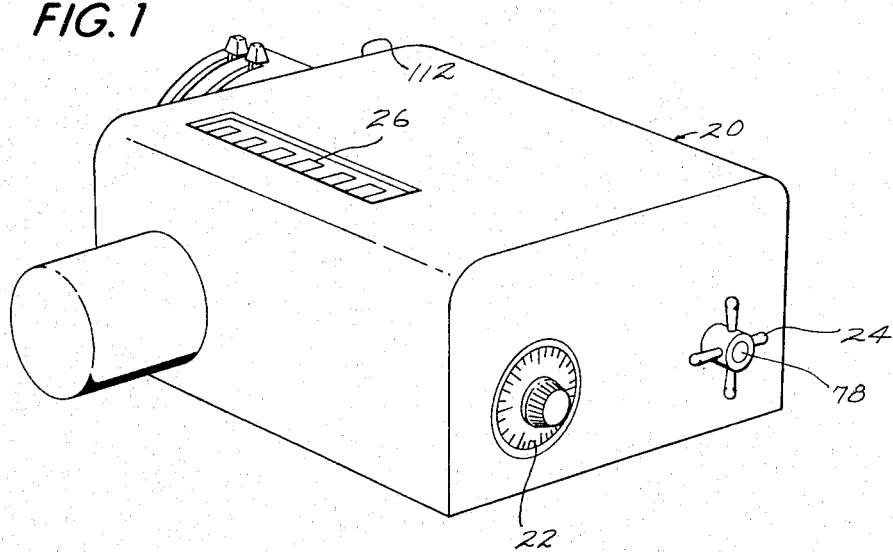
FIG. 1 is a partial reproduction of FIG. 1 of U.S. Patent No. 3,034,329 and presents a perspective view of a metering machine embodying the invention of said U.S. patent.
Figure 3:
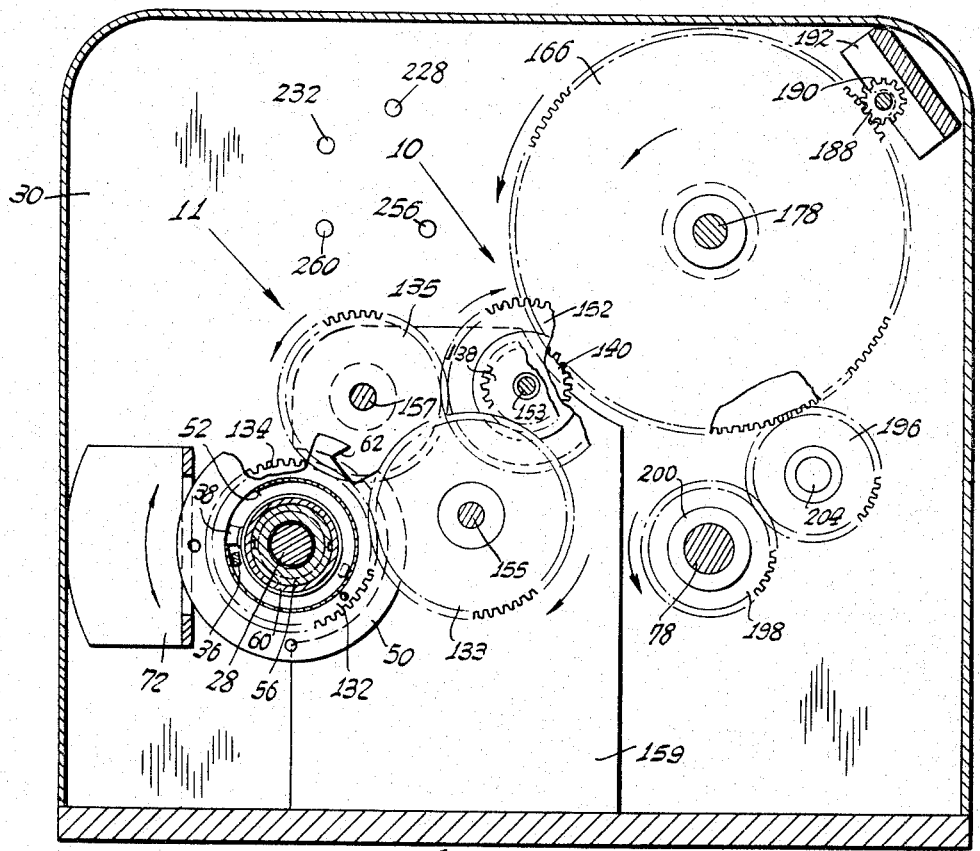
FIG. 3 is a front elevational, sectional view showing a portion of the combination lock and means for altering the correct combination according to a predetermined random pattern.
Figure 6:
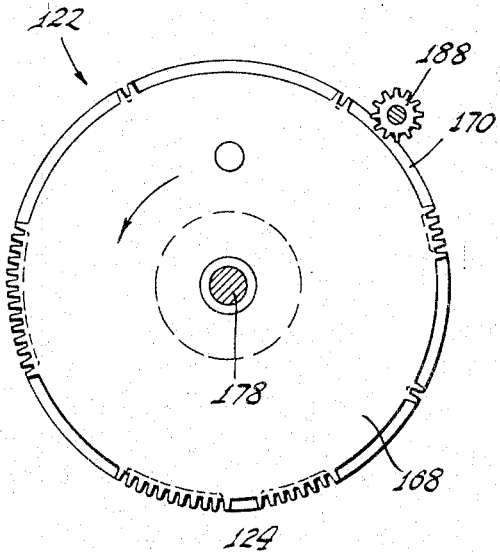
Figure 7:
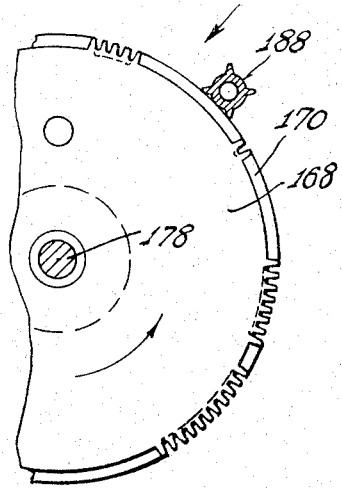
Figure 8:
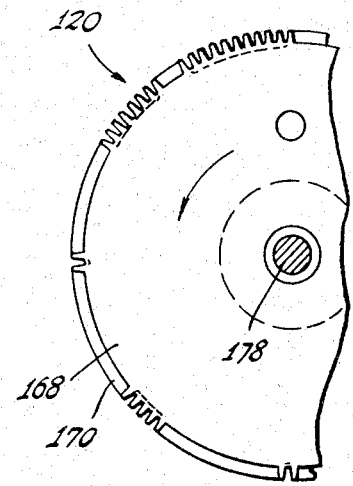
Figure 12:
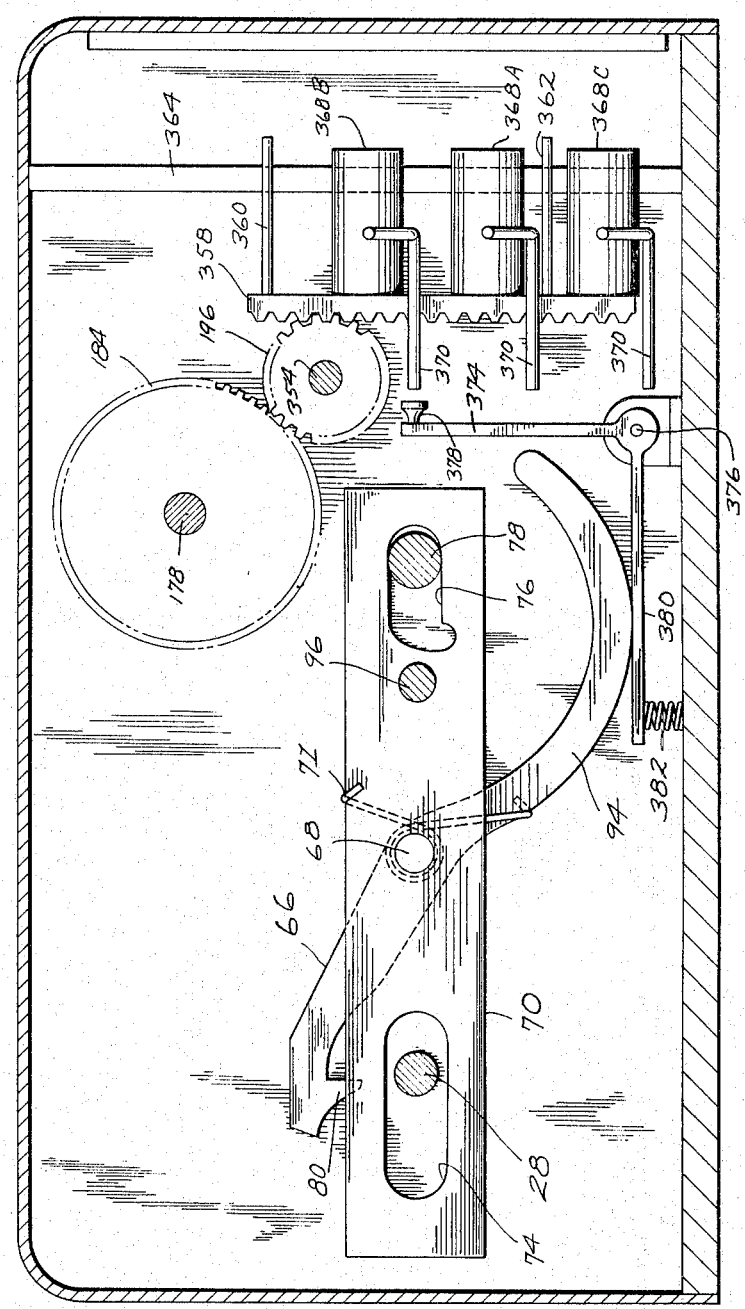

FIGS. 6, 7, and 8 are respective side elevational views of the mutilated gear and locking wheel of the three respective variable-output mechanisms which are drivably connected to the three differential units;

FIG. 9 is a fragmentary sectional view in front elevation taken along the line 9—9 of FIG. 10, of a first embodiment of the present invention;

FIG. 10 is a sectional view in side elevation, taken along the line 10—10 of FIG. 9, of the embodiment shown in FIG. 3;

FIG. 11 is a fragmentary perspective view similar to FIG. 1 of a machine including a second embodiment of the invention;

FIG. 12 is an enlarged sectional view in front elevation of the embodiment of FIG. 11 with certain portions omitted for clarity.

Although the present invention constitutes an improvement of the combination lock disclosed and claimed by U.S. Patent No. 3,034,329, it is concerned primarily with modification of the input end of the mechanism for changing the correct combination. Accordingly, in the interest of clarity and brevity, the patented construction is described and illustrated hereinafter only to the extent necessary to determine and appreciate the situs and purpose of the invention. For convenience, elements corresponding to parts shown in said U.S. Patent No. 3,034,329 are identified herein by the same numerals used in said patent. It is to be understood also that reference may be had to said Patent No. 3,034,329 for amplification and explanation of terms and mechanisms employed or referred to hereinafter, and to the extent deemed necessary, the following specification shall be deemed to include the disclosure presented by said patent.

Referring now to FIG. 1, there is shown a metering machine 20 (as described in said U.S. Patent No. 3,034,329) for printing and metering value impressions such as postage, tax stamps, and the like. This machine includes a combination lock dial 22, an actuating handle 24, and a register 26. When dial 22 is operated according to the correct combination (first by clockwise and then by counterclockwise turns), the lock (later to be described) is unlocked. This releases actuating handle 24 which is then operated by rotating it 120° in the counterclockwise direction. This rotation of handle 24 accomplishes the three interrelated functions mentioned previously, namely (1) the combination lock is relocked thereby preventing subsequent operation of the actuating handle until the combination lock is again unlocked by again operating dial 22 according to the correct combination; (2) the correct combination is altered according to a predetermined random pattern; and (3) the register 26 is reset by a predetermined amount.

The patented combination lock referred to above (and of which the present invention constitutes a modification) essentially comprises an adjustable tumbler assembly consisting of a plurality of individual adjustable tumblers, a differential assembly comprising a like plurality of like differential units each operative to adjust the setting of a different tumbler, and a variable output assembly comprising a like plurality of variable output units each having an output member in driving relation with a separate one of said differential mechanisms and an input member so interconnected with said output member that a constant amount of movement of said input member effects a variable amount of movement of said output member according to a predetermined random pattern. The input members of all of the variable output mechanisms are connected to a common input actuator.

Figure 4:
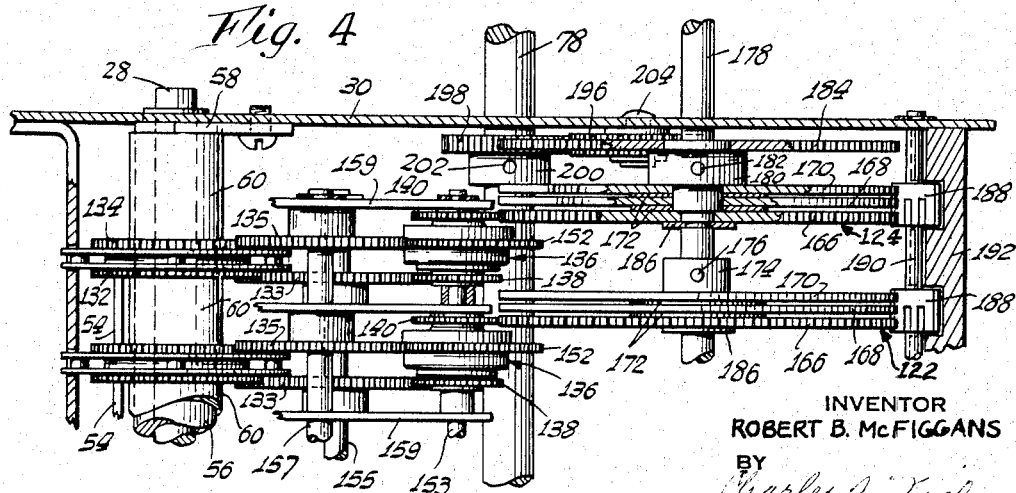
FIG. 4 is a fragmentary view taken in the direction of arrow 10 in FIG. 3.
Figure 5:
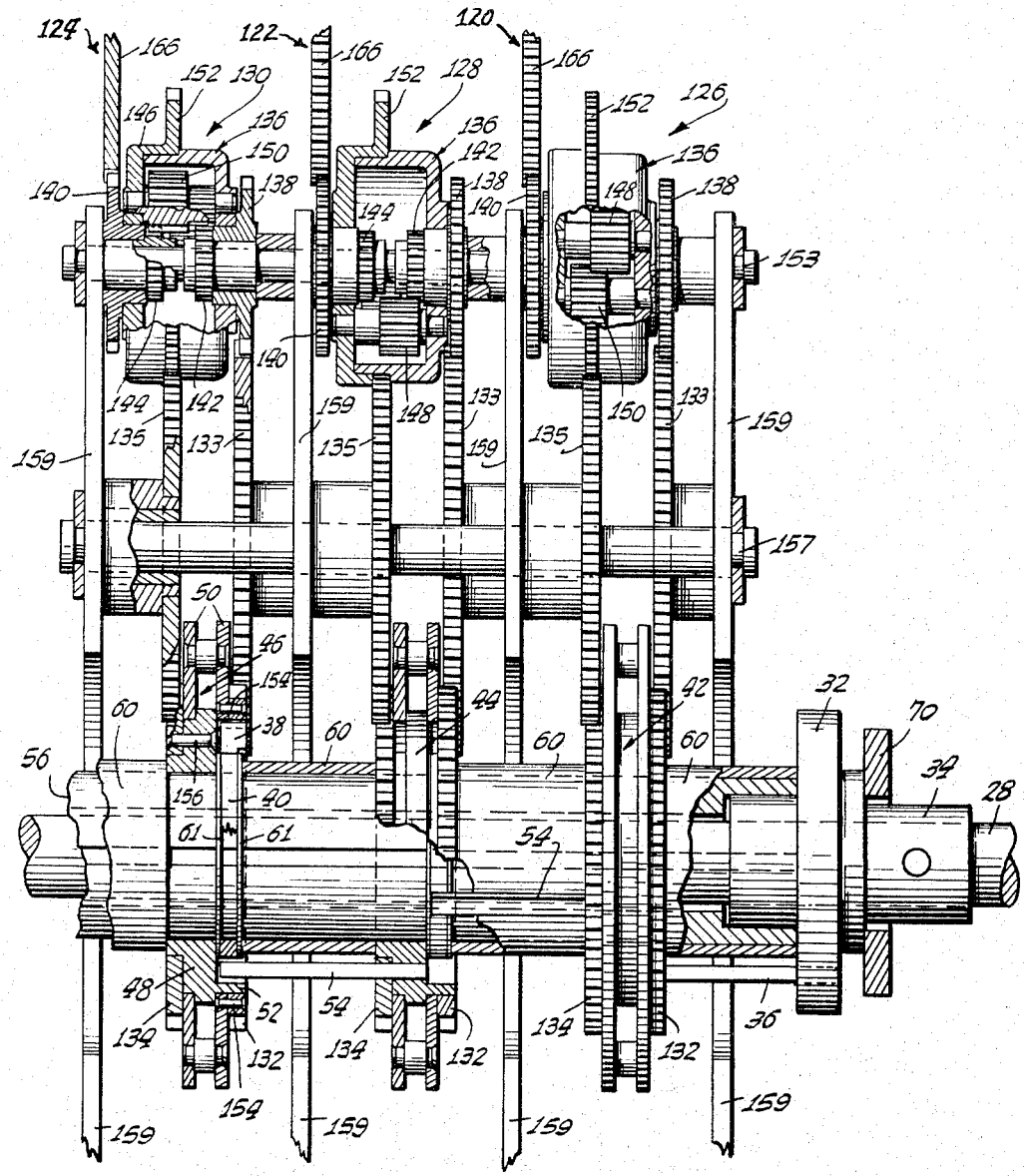
FIG. 5 is an enlarged, fragmentary view partly in section and with parts broken away, this view being taken in the direction of arrow 11 in FIG. 3 and showing details of the combination lock tumblers and the differential units connected thereto.

The combination lock referred to above will now be described with reference to FIGS. 2–8. Dial 22 is fixed at one end of a rotatable shaft 28, this shaft being supported for rotation by an intermediate wall 30 and the front wall 31 of the casing of the metering machine. A drive wheel 32 has an integral hub 34, the latter being pinned and thereby fixed to shaft 28. Drive wheel 32 carries a lateral extension 36 (see FIG. 5) whose free end is engageable with a radial projection 38 integral with a flyer 40 of a first tumbler generally designated at 42. Tumbler 42 is identical with each of two other tumblers generally designated at 44 and 46, respectively. Each of tumblers 42, 44 and 46 includes an inner hub member 48 and an outer annular disc member 50 as best shown in FIG. 5. Radial projection 38 of the flyer 40 of each of the tumblers is engageable with a laterally extending rim portion 52 of the hub member 48 of that tumbler. The hub member 48 of each of tumblers 42 and 44 carries a lateral extension 54 which is engageable with the radial projection 38 of the flyer 40 of the next tumbler whereby each of lateral extensions 54, 54 corresponds in structure and function to lateral extension 36 of drive wheel 32. Each of lateral extensions 36, 54, 54 has lost motion relative to the flyer 40 with which it is engageable, and the flyer of each of tumblers 42, 44 and 46 has lost motion relative to the rim portion 52 of that respective tumbler. Accordingly, dial 22 has a lost motion driving connection with tumbler 42, tumbler 42 has a lost motion driving connection with tumbler 44, and tumbler 44 has a lost motion driving connection with tumbler 46. The lost motion between dial 22 and tumbler 42, between tumblers 42 and 44, and between tumblers 44 and 46 is, in each case, one full revolution.

Rotatable shaft 28 extends through a sleeve 56 which is prevented from rotating by means of a dog 58 (see FIG. 4) carried by intermediate wall 30. Each of tumblers 42, 44 and 46 is mounted for rotation about fixed sleeve 56, the respective tumblers being spaced from each other and from wall 30 and drive wheel 32 by means of hubs 60. A washer 61 is disposed at each side of the flyer 40 of each tumbler, and each of these washers is keyed to sleeve 56, thereby isolating each of the flyers from any tendency to frictionally drive the respectively adjacent hub 60 or tumbler hub 48.

So long as the hub 48 remains fixed relative to the outer disc 50 of each of tumblers 42, 44 and 46, the correct combination for opening the combination lock remains unchanged.

To unlock the combination lock, dial 22 is rotated three complete revolutions in the clockwise direction (as viewed in FIGS. 1–3) to ensure that all the lost motion between the dial and all of the tumblers is taken up; and this clockwise rotation is then continued until the dial is stopped at the first number of the correct combination. This will leave a gate or slot 62 in the outer periphery of tumbler 46 aligned with a fence 64, the latter extending across all three of the tumblers. The dial is then rotated in the counterclockwise direction two full revolutions plus the amount necessary to bring the dial to the second number of the correct combination. This results in the take-up of the lost motion between the dial and tumbler 44 and movement of the latter to the position at which it stands with its gate 62 in alignment with fence 64. This counterclockwise rotation of dial 22 does not effect any movement of tumbler 46 because the lost motion between tumblers 46 and 44 is not taken up by anything less than three full reverse revolutions of the dial. The dial is then rotated in a clockwise direction one full revolution plus the amount necessary to bring the dial to the third number of the correct combination whereby the gate 62 of tumbler 42 is aligned with the fence 64. This latter clockwise rotation of the dial does not effect any movement of either of tumblers 44 and 46 because the lost motion between tumblers 42 and 44 will not be taken-up by anything less than two full reverse revolutions of the dial.

The gates 62 of all three of the tumblers being aligned with fence 64, the latter will subsequently be permitted to move into these gates. If any one of gates 62 is misaligned with fence 64, the fence cannot, of course, enter any of the gates. Fence 64 is carried by a fence lever 66, the latter being pivotally mounted on a pin 68 carried by a locking bolt 70 and urged in the counterclockwise direction by a spring 71. Bolt 70 rides in a slot provided by a bracket 72. Bolt 70 has a pair of slots 74 and 76 therein. Hub 34 of drive wheel 32 extends through slot 74, and an actuating shaft 78, which fixedly carries actuating handle 24, extends through slot 76. In this manner, bolt 70 is supported and guided for horizontal endwise movement.

Figure 2:
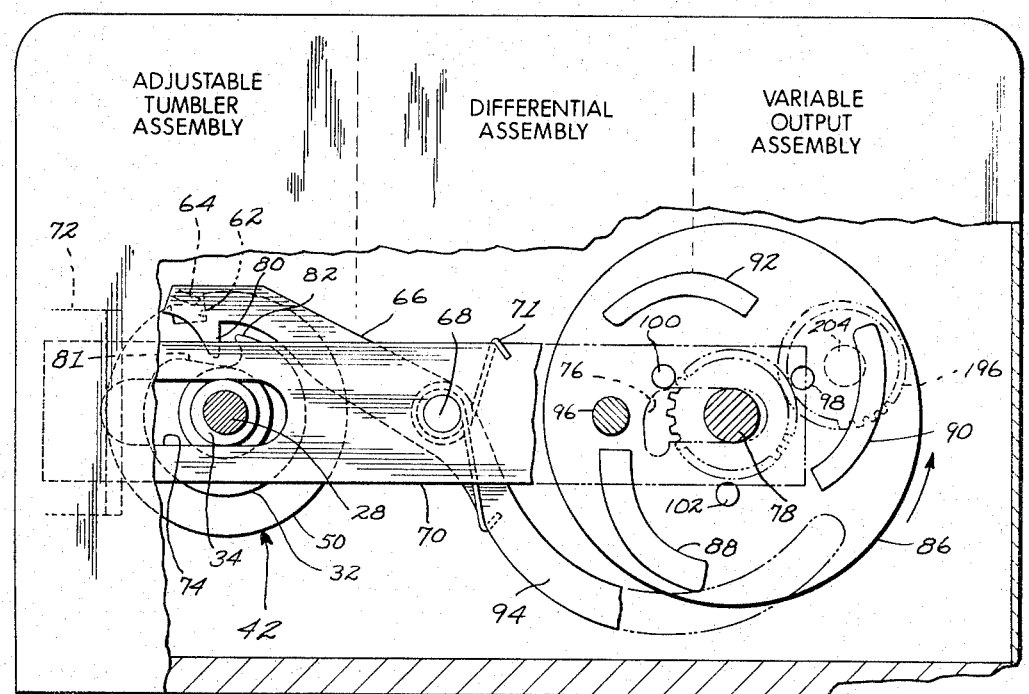
FIG. 2 is a front elevational view, partly in section, of the machine of FIG. 1, with certain parts omitted entirely for purposes of clarity while the presence and relative positions of certain important mechanisms are indicated by appropriately placed terms derived from the specification of said patent.

With fence 64 in alignment with the gates 62 of all three of the tumblers as shown in FIG. 2, movement of the fence into the gates is prevented only by a nose 80 of fence lever 66, this nose engaging the outer periphery of drive wheel 32. As can be seen in FIG. 2, drive wheel 32 has an inwardly extending cam surface 81 and a projection 82.

Upon counterclockwise rotation of dial 22, nose 80 rides on the periphery of drive wheel 32 and then along cam surface 81 whereupon fence 64 enters the gates 62 of the tumblers. As this counterclockwise rotation continues, the projection 82 of drive wheel 32 moves against nose 80 of fence lever 66 to slide bolt 70 to its leftward retracted position whereby the combination lock is unlocked, as shown in FIG. 2. This latter counterclockwise rotation of dial 22 does not cause rotation of any one of the three tumblers because anything less than a full reverse revolution of the dial will not take up the lost motion between drive wheel 32 and tumbler 42. If the gate 62 of any one or more of the tumblers is not aligned with fence 64 when drive wheel 32 is rotated in either direction, fence 64 will ride on the periphery of that one or more tumblers, thereby preventing nose 80 from riding on cam surface 81.

The combination lock, to the extent described above, is of conventional construction. A hub, not shown, is integral with a cam disc 86 (FIG. 2), this hub being pinned to actuating shaft 78. With locking bolt 70 in the retracted unlocked, position of FIG. 2, actuating shaft 78 is free to be rotated 120° in the counterclockwise direction. This rotation of shaft 78 effects counterclockwise rotation of cam disc 86 to move a cam 88, of three spaced cams 88, 90 and 92, against a tail 94 of the fence lever 66 thereby pivoting the latter in the clockwise direction to move fence 64 out of the aligned gates 62 of tumblers 42, 44 and 46. As counterclockwise rotation of cam disc 86 continues, cam 92 moves against a lateral pin 96 carried by locking bolt 70 thereby to return the latter to the right to its locking position. Counterclockwise movement of cam disc 86 and actuating shaft 78 is limited to 120° by the engagement of a stop pin 98, of three spaced stop pins 98, 100 and 102, with pin 96 carried by bolt 70. Bolt 70 is restrained against inadvertent dislodgement from its retracted and locking positions by means of a detent (not shown) pivoted about pin 96 into engagement at either side of shaft 78 under the yieldable force of a suitable spring.

With the parts in the positions as shown in FIG. 2, the combination lock is unlocked. As described above, when actuating handle 24 and actuating shaft 78 are rotated in the counterclockwise direction, cam 88 first acts against the tail 94 of fence lever 66 to lift fence 64 out of the gates 62 of the three tumblers and then cam 92 acts against pin 96 to move locking bolt 70 rightward to its locking position. By the time bolt 70 reaches its locking position, cam 88 acting against tail 94 will have permitted the nose 80 of fence lever 66 to move downwardly into engagement with the peripheral surface of drive wheel 32 at a point forward (in the clockwise direction as viewed in FIGURE 2) of the end of projection 82. With the parts in this position, fence 64 will be correspondingly misaligned with the gates 62 in the three tumblers. If, then, dial 22 is merely rotated in the counterclockwise direction, projection 82 of drive wheel 32 will not re-engage nose 80 of fence lever 66 to retract bolt 70 to its unlocked position because fence 64 will rest or ride on the outer periphery of one or more of the tumblers thereby holding nose 80 in elevated position out of the path of projection 82. It will be apparent, then, that once the combination lock is relocked by the operation of actuating handle 24, the lock cannot be unlocked merely by rotating the dial 22 in the counterclockwise direction. Rather, the combination lock can be unlocked, after being locked, only by again operating the dial according to the correct combination.

It will be noted that actuating shaft 78 is constantly prevented from rotating in the clockwise direction by means of a conventional anti-reverse device (not shown).

From the above, it will be seen that when locking bolt 70 is in the rightward, locking position counterclockwise rotation of handle 24 to operate actuating shaft 78 is prevented by the engagement of one of stop pins 98, 100, 102 with the pin 96 carried by the bolt. When bolt 70 is retracted to the leftward, unlocked position as shown in FIG. 2 handle 24 and actuating shaft 78 are free for the above-described counterclockwise rotation of 120°; after which rotation, the next succeeding one of stop pins 98, 100, 102 engages pin 96 thereby again preventing operation of handle 24 and actuating shaft 78 until the combination lock is again unlocked by retracting bolt 70.

As noted above, so long as the inner hub member 48 remains fixed relative to the outer annular disc member 50 of each of the tumblers, the correct combination for opening the combination lock remains unchanged. In their conventional form, each tumbler of the type shown in the drawing, is provided with means for securing the hub member 48 and disc member 50 thereof together once the combination lock has been set for a particular correct combination. This securing means is eliminated from each of the tumblers 42, 44 and 46 so that, except for means external to each of these tumblers, the respective hub member 48 and disc member 50 are freely rotatable relative to each other. When relative rotation between the hub member 48 and disc member 50 does occur, the correct combination is altered accordingly.

The means whereby the correct combination of the lock is altered according to a predetermined random pattern each time handle 24 is operated, will now be described. This means includes a differential unit for driving the hub member 48 and disc member 50 of each of the respective tumblers relative to each other, a variable-output mechanism for driving each of the differential units, and a common actuator for driving all of the variable-output mechanisms. Referring particularly to FIGS. 3, 4, and 5, actuating shaft 78 is the common actuator for driving all three of the variable-output mechanisms generally designated at 120, 122 and 124, respectively. Referring to FIG. 5, the differential unit generally designated at 126 drives the hub member and disc member of tumbler 42 relative to each other and is driven by variable-output mechanism 120; the differential unit generally designated at 128 drives the hub and disc members of tumbler 44 relative to each other and is driven by the variable output mechanism 122; and the differential unit generally designated at 130 drives the hub and disc member of tumbler 46 relative to each other and is driven by the variable-output mechanism 124.

Differential units 126, 128 and 130 are identical with each other. Referring to FIG. 5, each of these differential units comprises two gears 132 and 134, two idler gears 133 and 135, and a differential gear sub-assembly generally designated by the reference numeral 136. The differential sub-assemblies 136 are of a conventional type (as evidenced, for example, U.S. Patent No. 1,281,163 granted October 8, 1918 to M. C. Hopkins et al.) and therefore need not be particularly described. Briefly, each differential gear sub-assembly comprises two exterior gears 138 and 140, each of which fixedly carries an interior sun gear 142 and 144, respectively. A two-part shell 146 is force fit together and rotatably mounts gears 138, 142 at one side and gears 140, 144 at the other side. Each of the two parts of shell 146 also provides bearings for two intermeshed planetary gears 148, 150. Planetary gear 148 also meshes with sun gear 142 and planetary gear 150 also meshes with sun gear 144. One of the two parts of shell 146 has an integral, radially extending portion which forms a third exterior gear 152. For convenience in distinguishing therebetween, exterior gears 138 and 140 will, at times, be referred to hereinafter as side gears and exterior gear 152 will hereinafter be referred to as an intermediate gear. Each of side gears 138, 140 has twenty-five teeth, each of sun gears 142, 144 has fifteen teeth, each of planetary gears 148, 150 has twelve teeth and each intermediate gear 152 has fifty teeth.

As best shown in FIGS. 3–5, each idler gear 133 meshes with and drivingly interconnects a gear 132 and a side gear 138, and each idler gear 135 meshes with and drivingly interconnects a gear 134 and an intermediate gear 152. Each gear 132 is fixed, by means such as rivets 154, to the disc member 50 of the associated one of tumblers 42, 44 and 46. In similar fashion each gear 134 is fixed, by means such as rivets 156, to the hub member 48 of the associated one of the tumblers. All of gears 132 and 134 are of the same size, all have fifty teeth and all are concentric with each other and with the tumbler members to which they are fixed. Each of idler gears 133 has sixty teeth and each of idler gears 135 has fifty teeth.

The differential units 136 are supported on a common shaft 153, idler gears 133 are supported for rotation about a common shaft 155, and idler gears 135 are supported for rotation about a common shaft 157. Shafts 153, 155 and 157 are mounted on four spaced standards 159 fixed to the base of the metering machine as shown in FIGS. 3–5.

It is characteristic of conventional-type differential subassemblies 136 that the amount any one of gears 138, 140 and 152 rotates for a given amount of rotation of one of the other two is determined by the amount the remaining one is rotated. More specifically, the relationship is that one-half of the algebraic sum of the amounts of rotation of side gears 138 and 140 always equals the amount of rotation of intermediate gear 152, taking either direction of rotation as positive and the other direction of rotation as negative. It follows that if the side gear 140 (of each differential sub-assembly 136) is held stationary, any amount of rotation of the side gear 138 in either direction will be accompanied by one-half that amount of rotation of the intermediate gear in the same direction. Since the intermediate gear 152 has twice the number of teeth that the side gear 138 has (each intermediate gear has fifty teeth and each side gear 138 has twenty five teeth), these two gears will have the same number of teeth move in the same direction past a given point on their respective pitch circles so long as side gear 140 is held stationary. It follows that each pair of gears 132, 134 (which both have fifty teeth and which will hereinafter be referred to as slave gears) will be freely rotatable but will be prevented from rotating relative to each other so long as the side gear 140 (which will hereinafter be referred to as a master gear) of the respective one of differential units 126, 128 and 130 is held stationary. The hub member 48 and disc member 50 of each of tumblers 42, 44 and 46 being drivingly connected to slave gears 134 and 132, respectively, of the associated one of differential units 126, 128 and 130, the respective hub and disc members of each of the tumblers will likewise be freely rotatable but not relative to each other while the respective master gear 140 is held stationary. Consequently, so long as the master gears 140 of all of the differential units 126, 128 and 130 are held stationary, the dial 22 can be operated to enter the correct combination into the combination lock (because the tumblers are freely rotatable) and this correct combination will remain unchanged (because the respective hub and disc members of all of the tumblers remain fixed, each with respect to the other).

It also follows from the above-noted relationship among the respective amounts of rotation of gears 138, 140 and 152 of each differential sub-assembly that any rotation of the master gear 140 will affect the amount that either one of side gear 138 or intermediate gear 152 will rotate with a given amount of rotation of the other. For example, intermediate gear 152 rotates one full clockwise revolution with two full clockwise revolutions of side gear 138 (resulting in no relative rotation between the slave gears 132 and 134 of that respective differential unit) when master gear 140 is held stationary. On the other hand, if master gear 140 is rotated one full clockwise revolution instead of being held stationary, intermediate gear 152 will rotate one and one-half clockwise revolutions with the same two full clockwise revolutions of side gear 138 (resulting in one-half a clockwise revolution of the slave gear 134 relative to the slave gear 132 of that respective differential unit). It follows that, instead of the freely rotatable slave gears 132, 134 of each differential unit being confined against rotation relative to each other as they are when the associated master gear 140 is held stationary, these freely rotatable slave gears will be rotated relative to each other when the associated master gear 140 is rotated; the amount of this relative rotation being proportional to the amount the master gear is rotated. The hub member 48 and disc member 50 of each of tumblers 42, 44 and 46 being drivingly connected to a slave gear 134 and 132, respectively, the respective hub and disc members of each tumbler will be rotated relative to each other when the master gear 140 of the associated differential unit is rotated, and the amount of this relative rotation will be proportional to the amount that master gear is rotated. Consequently, when any one or more of the respective master gears 140 of the differential units 126, 128 and 130 are rotated, the correct combination for unlocking the combination lock will be altered correspondingly.

The amount that each master gear 140 will be rotated each time actuating shaft 78 is rotated 120° in the clockwise direction, is determined by the respective one of variable-output mechanisms 120, 122 and 124 which drivingly connects the particular master gear 140 with common actuating shaft 78. All three of these variable-output mechanisms are identical with each other except for variable arrangements of gear teeth, all as will become clear as the description proceeds.

Referring to FIGS. 3, 4 and 6–8, each of the variable-output mechanisms includes a full-tooth gear 166 having one hundred twenty teeth, a mutilated gear 168 and a locking wheel 170. An annular spacer 172 is disposed between the gears 166 and 168 and between the gear 168 and the locking wheel 170 each variable-output mechanism. The mutilated gear 168, the locking wheel 170 and the two spacers 172, 172 of each of the variable-output mechanisms 120 and 122 are brazed onto a respective hub 174, each of the latter being pinned at 176 to a shaft 178. The mutilated gear 168, the locking wheel 170 and the two spacers 172, 172 of variable-output mechanism 124 are likewise brazed onto a hub 180, the latter being pinned at 182 to shaft 178. Hub 180 also has a full-tooth gear 184 brazed thereto, this latter gear having one hundred twenty teeth. Shaft 178 is rotatably supported by front wall 31, intermediate wall 30 and rear wall 112 of the casing of the metering machine. It will be apparent from the above that the mutilated gear 168 and locking wheel 170 of all of the variable output mechanisms 120, 122 and 124 are rotatable with gear 184 and shaft 178. Each of the full tooth gears 166 is rotatable about shaft 178 and is retained in place against the end of the respective one of hubs 174, 174, 180 by means of a spring washer 186 seated in a groove about shaft 178.

Each variable-output mechanism further includes a conventional type, twelve tooth Geneva pinion 188. Geneva pinions 188 are rotatable about a common shaft 190, the latter being supported at its opposite ends by intermediate wall 30 and front wall 31. Shaft 190 is reinforced along its length by a reinforcing bar 192 having transverse slots within each of which, one of Geneva pinions 188 is retained against displacement along this shaft.

Four of the twelve teeth of each Geneva pinion 188 extend the full width of that Geneva pinion and are equally spaced about the periphery thereof as best shown in FIG. 4 and by the section of the Geneva pinion 188 as shown in FIG. 6. The extended portions of these four teeth of each Geneva pinion 188 cooperate with the locking wheel to lock the Geneva pinion at any one of four rotational positions in a manner well known to those skilled in the art of motion-translating mechanisms. Since a single tooth on one of the mutilated gears will drive its associated Geneva pinion two teeth and since each additional tooth on the mutilated gear will drive the Geneva pinion one additional tooth, the number of teeth in each group of successive teeth about the periphery of each of the mutilated gears will be one less than a multiple of three. As indicated above, each locking wheel 170 will lock its associated Geneva pinion in any one of the four rotational positions it assumes before and after each group of successive teeth on the next adjacent mutilated gear move past that Geneva pinion.

The groups of successive teeth, with blank spaces between the groups, are arranged in a predetermined random pattern about the periphery of each respective mutilated gear as shown in FIGS. 6, 7 and 8. For each one tooth movement of gear 184, each one of the three mutilated gears will drive its respective Geneva pinion one tooth or no teeth depending upon the respective random pattern of teeth of that mutilated gear.

Full tooth gear 184, which is fixed to shaft 178 as are the mutilated gear 168 and locking wheel 170 of all of the variable-output mechanisms 120, 122 and 124, is in mesh with a full tooth idler gear 196. Idler gear 196 is in mesh with a full tooth gear 198, the latter being integral with a hub 200 which is pinned at 202 to actuating shaft 78 as best shown in FIGS. 3 and 4. Idler gear 196 is rotatable about a stub shaft 204 carried by intermediate wall 30. Gear 198 has thirty-nine teeth, as does idler gear 196.

When handle 24 and actuating shaft 78 are rotated 120° in the counterclockwise direction as viewed in FIG. 2 (after the combination lock is unlocked), gear 198 is rotated thirteen teeth to rotate idler gear 196 and gear 184 thirteen teeth. This causes the mutilated gear 168 of all three variable-output mechanisms 120, 122 and 124 to rotate thirteen teeth so that each of the mutilated gears will drive its respective Geneva pinion 188 any number of teeth from and including zero through and including thirteen, depending upon the predetermined random pattern of the teeth about the periphery of the respective mutilated gears. Each Geneva pinion 188 will drive the full tooth gear 166 with which is meshes, the same number of teeth in the counterclockwise direction as that which it is driven in the clockwise direction. Taking the case of a Geneva pinion 188 being rotated one tooth, the associated full tooth gear 166 will be rotated one tooth as will the respective master gear 140 of the associated one of differential units 126, 128 and 130. This results in one tooth of relative movement between the hub member 48 and disc member 50 of the associated tumbler. Dial 22 is marked off into one hundred evenly spaced graduations. Hence this one tooth of relative movement between hub member 48 and disc member 50 will alter the correct combination by two graduations on the dial 22. Accordingly, each one tooth movement of the Geneva pinion 188 of each of the three variable-output mechanisms 120, 122, 124, causes a change of two digits in one of the three numbers of the correct combination of the combination lock.

It will be noted that when any one of master gears 140 is rotated to rotate the hub and disc members of the associated tumbler relative to each other, this relative rotation may come about in any one of the following ways: only the hub member will rotate, only the disc member will rotate, or both the hub and the disc member will rotate. Which one of these that occurs depends, to a large extent, on the vagaries of each individual differential unit and tumbler set; but the end result, so far as altering the correct combination is concerned, will be the same in any case. This is so because it is the position of the hub and disc members relative to each other that governs what the correct combination will be; the hub and disc members being otherwise freely rotatable as a unit to permit alignment of the gates 62 of all the tumblers when dial 22 is operated according to the correct combination. It will be noted that each time handle 24 is operated by rotating it 120° in the counterclockwise direction, several degrees of this rotation are required to effect movement of fence 64 out of the gates 62 of all three of tumblers 42, 44 and 46. If, as will often be the case, one or more of the mutilated gears 168 is driving its associated Geneva pinion 188 during this initial several degrees of rotation, the disc member of the associated one of the tumblers will be restrained by the fence 64 against rotation. In this case, it will be only the hub member of that tumbler that will be rotated, at least until the fence 64 moves clear of the gates 62 as provided by the disc members of the tumblers.

The manner in which the correct combination is altered according to a predetermined random pattern will become apparent from the following example. Let it be assumed that, initially, the correct combination is 35–3–40. This means that in unlocking the combination lock, the dial is turned in the clockwise direction (as viewed in FIG. 1) at least three full revolutions plus the amount necessary to bring the dial to the number 35, then in the counterclockwise direction two full revolutions plus the amount necessary to bring the dial to the number 3, then one full clockwise revolution plus the amount necessary to bring the dial to the number 40, and then in the counterclockwise direction to retract the locking bolt 70. Let it further be assumed that the mutilated gears 168 of the three variable-output mechanisms 120, 122 and 124 drive their associated Geneva pinions four, eleven and thirteen teeth, respectively, when handle 24 is rotated 120° in the counterclockwise direction after the above-noted, initial, correct combination was entered into the combination lock. Each number of the new correct combination is obtained by multiplying two times the number of teeth the respective Geneva pinion 188 is driven (the slave gears 132, 134 move relative to each other the same number of teeth as the associated Geneva pinion moves, and each tooth of this relative movement equals two graduations on dial 22) and subtracting the result from corresponding number of the immediately preceding correct combination. In this case, 13 (which is the number of teeth the Geneva pinion 188 of variable-output mechanism 124 is driven) multiplied by 2 equals 26, and 35 (which is the first number of the immediately preceding correct combination, the first number of the correct combination being determined by the tumbler associated with variable-output mechanism 124) minus 26 yields 9 as the first number of the new correct combination; 11 multiplied by 2 equals 22, 3 minus 22 equals minus 19 and (since dial 22 has one hundred graduations) minus 19 plus 100 yields 81 as the second number of the new correct combination; and 4 multiplied by 2 equals 8, and 40 minus 8 yields 32 as the third number of the new correct combination. The correct combination will, therefore, have been altered from 35–3–40 to 9–81–32.

It will be apparent from the above example that the random pattern by which the correct combination is altered each time handle 24 is operated, is predetermined according to the individual random pattern of the teeth about the periphery of the mutilated gear 168 of each of the variable-output mechanisms 120, 122 and 124 and also according to the rotational position of the mutilated gear of each of the variable-output mechanisms. Each mutilated gear 168 occupies any one of one hundred twenty different rotational positions, this being the case because each of these gears is fixed for rotation with full tooth gear 184 and the latter occupies any one of one hundred twenty different rotational positions. If all three of the mutilated gears 168 are identical with each other, they can be set in $(120)^3$ or 1,728,000 different combinations of relative rotational positions. Accordingly, 1,728,000 different predetermined random patterns by which the correct combination is altered, can be provided using only one pattern for the arrangement of the groups of successive teeth about the periphery of the multilated gears. By using additional patterns for the arrangement of the teeth about the periphery of the respective mutilated gears, the number of different predetermined random patterns by which the correct combination is capable of being altered, is greatly increased.

It will be apparent that when handle 24 and actuating shaft 78 are locked by the combination lock against rotation in the counterclockwise direction, the master gear 140 of all three of differential units 126, 128 and 130 will be locked against rotation either because the associated Geneva gear 188 is locked by its locking wheel 170 or, in the situation when one or two teeth of its multilated gear 168 are in mesh with that Geneva gear, the latter is locked, not by its locking wheel 170, but rather by the actuating shaft 78. Accordingly, the hub member and disc member of each of tumblers 42, 44 and 46 remain fixed relative to each other, and the combination remains unaltered, so long as handle 24 and actuating shaft 78 remain locked.

Each time actuating handle 24 is operated by rotating it 120°, the respective mutilated gear 168 of each of the variable-output mechanisms 120, 122 and 124, is rotated 13/120 of a revolution. It follows that the respective rotational position occupied by each mutilated gear 168 at any given time between successive operations of handle 24 will not again be duplicated between successive operations of handle 24 until the latter has been operated one hundred and twenty times. This being the case, the random pattern by which the correct combination is altered will not begin repeating itself until the handle 24 has been operated one hundred and twenty times. It will be noted that, even though this random pattern does begin to repeat itself after one hundred and twenty operations of handle 24, the correct combination will not, provided that the total number of teeth driven on each of the Geneva pinions 188 in each 360° of motion of each mutilated gear is not 50 or a multiple of 50. This is so because the correct combination after one hundred and twenty operations of handle 24 will then not be the same as it was before this one hundred and twenty operations.

In the postage metering machine illustrated in U.S. Patent No. 3,034,329, the actuating shaft 78 is connected to register 26 by suitable mechanism (not shown) in such a manner that each time the shaft rotates 120°, the register is reset a predetermined amount. However, it is to be appreciated that the patented lock combination may be used in other machines where shaft 78 actuates some other mechanism. Thus, the two forms of the invention hereinafter described are applicable to a wide variety of security systems, e.g., vaults, safes, and for inventory control, for example, with bulk dispensing devices, etc.

The present invention improves upon the patented combination lock construction just described by provision of suitable means that enables the combination to be changed independently of actuating shaft 78, and, conversely, permits that shaft to be operated once or a number of times without an attendant change in lock combination. This improvement renders the combination lock device more versatile and, therefore, adaptable to a greater variety of applications.

Turning now to FIGS. 9 and 10, shaft 78 is deprived of its gear 198 and stub shaft 204 is replaced by a longer shaft 310. Gear 196 (formerly on shaft 204) is fixedly mounted on shaft 310. Omission of gear 198 does not alter the connection between shaft 78 and locking bolt 70; on the other hand, gear 196 which drives the variable output mechanisms via gear 184 now is independent of shaft 78 and is controlled by shaft 310. To this modified structure there is added a synchronous motor 312 supported on a fixed bracket 314. The motor has an output shaft 316 which carries a worm 318 and is coupled through a conventional single revolution clutch 320 to shaft 310. The clutch has an actuating finger 322. Each time finger 322 is tripped, clutch 320 connects shaft 310 to shaft 316 for one revolution. A stand 324 rotatably supports a short shaft 326 which extends parallel to shaft 316. One end of the shaft carries an arm 328 with an extension 330 for tripping the clutch actuating finger 322. The other end of shaft 326 carries a worm gear 334. Interposed between shafts 316 and 326 at right angles thereto is another short shaft 338 carrying a worm 340 which engages and drives worm gear 334. Another gear 342 on shaft 338 meshes with and is driven by worm 318. Hence, shaft 326 rotates continuously in synchronism with shaft 316, but at a slower speed. The actuating finger 322 and the extension 330 are shaped and disposed so that for each revolution of arm 328 the clutch is tripped only once. Each time the clutch is tripped, gear 196 acts through gear 184 to operate the variable-output mechanisms, whereby to change the lock combination in the manner previously described. The frequency at which the combination is changed is determined by the motor speed and the speed reduction effected by the gears connecting shafts 316 and 326. Any suitable time interval can be obtained by varying the gear reduction between the two shafts.

This first form of the invention thus provides automatic changing of the correct combination at regular intervals, e.g., every 8 hours, regardless of whether or not the combination lock is opened, or how often it is opened. To keep track of how many times the combination has changed and thereby determine which of the possible combinations is current, the embodiment of FIGS. 3 and 4 is provided with a mechanical counter 346 whose input shaft has a gear 348. The latter is driven by a gear 350 mounted on shaft 310. The counter is adapted to advance its count by one each time shaft 310 rotates once, i.e., each time the combination is changed. A window 352 in the wall of the housing permits instant reading of the counter.

The second embodiment of the invention shown in FIGS. 5 and 6 is adapted to record the number of times three different individuals use the same lock. In this case, gear 198 is again omitted from shaft 78 so that when handle 24 is rotated it cannot affect the correct combination. Stub shaft 204 also is omitted but its gear 196 is mounted on a new shaft 354 positioned so that gear 196 can mesh with a rack 358 as well as gear 184. The latter is supported by two brackets 360 and 362 which are slidably mounted on a rectangular vertical guide rod 364. Attached to the rack are three identical counters 368A, 368B, and 368C, each having a spring-biased, L-shaped actuating arm 370. Each counter is actuated by rocking its arm counterclockwise (as seen in FIG. 12). The arms are operated by an upstanding lever 374 which is pivoted as shown at 376. The upper end of lever 374 is fitted with a laterally extending hammer head 378. The bottom end of lever 374 has an arm 380 which extends horizontally beneath the fence lever 66 and is engaged by its tail 94. A compression spring 382 urges lever 374 clockwise up against tail 94, but it will be held down as shown so long as the fence is prevented from entering the gates 62 of the several tumblers 42. When the fence does enter the gates (as a result of entry of the correct combination in the manner previously described), the tail 94 will have moved upward enough to permit lever 374 to pivot clockwise to the extent required to operate one of the counters 368. Only one counter is operable at a time, and which one is operated depends upon the position of rack 358, which in turn depends on the angular position of shaft 354. Shaft 354 extends through the front wall of the housing and is fitted with a knob 386 (FIG. 11). Detent means (not shown) determine three different positions for shaft 354, each differing by an amount equivalent to the spacing between the three counters. These three different positions are identified as "A," "B," and "C" on the front wall of the housing. The knob has a radial extension 388 which serves to indicate whether the knob is in the "A," "B," or "C" position. At each position a different counter will have its actuating arm in position to be hit by hammer 378. Thus, when the knob is in the "B" position, the rack will have dropped low enough to dispose counter 368B in actuating position. Counters 368A and 368C assume the same actuating position when knob 386 is rotated to its "A" and "C" positions, respectively. Although not shown, it is to be understood that mechanical stop members are employed to prevent shaft 354 from rotating clockwise beyond position "B" and counterclockwise beyond position "C."

The mode of operation of the embodiment of FIGS. 5 and 6 is straightforward. Each time the lock is unlocked, one of the counters will be actuated. Assuming that three different persons are to use the device, each is assigned a different knob position and is required to position the knob at his assigned position before using the device. This change of position automatically changes the correct combination and also positions the correct one of the counters 368 in actuating position. So long as the position of knob 386 remains unchanged, the correct combination remains unchanged, and each time that combination is entered, the same counter will be actuated. Hence, that counter will reflect the number of times that the same combination has been entered (or the number of times the same person has opened the lock, assuming that only one person knows the correct combination). As soon as the knob 386 is rotated to a different position, a new combination corresponding to that position is required to open the lock, and a different counter 368 will be actuated each time that combination is entered. The total number of times that correct combinations have been entered is determined by totalling the counts in the three counters. Thus as illustrated, three persons one knowing the combination corresponding to position A, the second to position B and the third to position C, could have access to the lock, without knowing each other's combination. The use of the lock by A, B or C is accounted for by the counter 368 actuated at each respective position. Where the lock is used to provide access to a system or device that operates on increment basis with an increment being available on *each* unlocking, the increments are available to each person, and the number of increments taken by each will be recorded on the respective counter 368. By way of example, the lock may be used to control access to a bulk dispensing unit. It will be understood that the number of knob positions and counters could be greater than three, and that other arrangements could be used to record operation of the lock at each position.

The present invention, as illustrated by the foregoing embodiments, is believed to constitute a significant improvement of the combination lock of U.S. Patent No. 3,034,329 in that it permits the lock to be opened and closed without changing the combination and, conversely, permits the combination to be changed without unlocking the lock or operating the actuating shaft 78. This improvement facilitates control of a wide variety of systems by means of actuating shaft 78.

It is to be understood that the invention is not limited in its application to the details of construction and arrangement of parts specifically described or illustrated, and that within the scope of the appended claims, it may be practiced otherwise than as specifically described or illustrated.

I claim:

1. Apparatus comprising a combination lock adapted to be unlocked upon entry of the correct combination, and an actuating member operatively arranged for actuating movement when said lock is unlocked and prevented from effecting said actuating movement when said lock is locked; said combination lock including first means for entering the correct combination, second means adapted to be driven for altering said correct combination, variable output mechanism connected to said second means and operative to drive said second means a variable amount according to a predetermined random pattern, and third means for operating said variable output mechanism independently of said first means and said actuating member.

2. Apparatus as defined by claim 1 wherein said third means is a time controlled mechanism.

3. Apparatus as defined by claim 1 wherein said third means is manually operable.

4. Apparatus as defined by claim 1 wherein said actuating member is operable to relock said lock.

5. Apparatus as defined by claim 1 further including at least one register under control of said third means and adapted to indicate that a change in combination has been effected.

6. A locking device comprising a combination lock having a plurality of tumbler units adjustable relative to each other by variable amounts to alter the correct combination of said lock, a variable output mechanism operative to adjust said tumblers by variable amounts according to respective predetermined random patterns to alter said correct combination according to a predetermined random pattern, first means for operating said tumbler units to enter the correct combination and unlock said lock, an actuating member operatively arranged for actuating movement when said lock is unlocked and prevented from effecting said actuating movement when said lock is locked, and second means independent of said actuating member for operating said variable output mechanism to alter said correct combination.

7. A locking device comprising a combination lock having a plurality of tumbler units adjustable relative to each other by variable amounts to alter the correct combination of said lock, a variable output mechanism operative to adjust said tumblers by variable amounts according to respective predetermined random patterns to alter said correct combination according to a predetermined random pattern, first means for operating said tumbler units to enter the correct combination required to unlock said lock, an actuating member operatively arranged for actuating movement when said lock is unlocked and prevented from effecting said actuating movement when said lock is locked, and second motor-controlled means independent of said first means and said actuating member for operating said variable output mechanism to alter said correct combination.

8. A locking device comprising a combination lock having a plurality of tumbler units adjustable relative to each other by variable amounts to alter the correct combination of said lock, a variable output mechanism operative to adjust said tumblers by variable amounts according to respective predetermined random patterns to alter said correct combination according to a predetermined random pattern, first means for unlocking said lock, said first means including means for operating said tumbler units to establish said correct combination, an actuating member operatively arranged for actuating movement when said lock is unlocked and prevented from effecting said actuating movement when said lock is locked, second means for relocking said lock upon actuating movement of said actuating member, and third intermittently actuated motor-controlled means for operating said variable output mechanism to alter said correct combination.

9. A locking device as defined by claim 8 wherein said third motor-controlled means is operative independently of said actuating member.

10. A locking device as defined by claim 8 further including a register, and means for actuating said register each time said combination is altered.

11. A locking device as defined by claim 8 wherein said means for actuating said register is operatively connected to and actuated by said motor-controlled means.

12. A locking device comprising a combination lock having a plurality of tumbler units adjustable relative to each other by variable amounts to alter the correct combination of said lock, a variable output mechanism operative to adjust said tumblers by variable amounts according to respective predetermined random patterns to alter said correct combination according to a predetermined random pattern, a locking bolt moveable between first and second positions, an actuating member operatively arranged for actuating movement when said bolt is in said second position and prevented from effecting said actuating movement when said bolt is in said first position, first means for operating said tumbler units to enter the correct combination, second means for moving said bolt to said second position when said tumblers are operated according to said correct combination, third operable means for actuating said variable output mechanism to alter said correct combination, fourth means for returning said bolt to said first position in response to actuating movement of said actuating member, and fifth means operative independently of said actuating member for operating said third operable means.

13. A locking device comprising a combination lock capable of being unlocked upon entry of the correct combination, and an actuating member operatively arranged for actuating movement when said lock is unlocked and prevented from effecting said actuating movement when said lock is locked, said lock having a plurality of rotatable tumbler units adjustable relative to each other by variable amounts to alter the correct combination of said lock, first means for rotating said tumbler units to positions corresponding to said correct combination, a variable output mechanism operative to adjust said tumblers by variable amounts according to respective predetermined random patterns to alter said correct combination according to a predetermined random pattern, said variable output mechanism including a rotatable input member independent of said actuating member, and second means for effecting movement of said input member.

14. Apparatus comprising a combination lock with a locking member adapted to be moved from a first locking position to a second unlocking position upon entry of the correct combination, an actuating member operably arranged for actuating movement when said locking member is in said second unlocking position and prevented from effecting said actuating movement when said locking member is in said first locking position, said combination lock including first means for moving said locking member to said second unlocking position upon entry of the correct combination, second means adapted to be driven for altering said correct combination, a variable output mechanism connected to said second means and operative to drive said second means a variable amount according to a predetermined random pattern, and third means for operating said variable output mechanism independently of said actuating member while said locking member is in said first locking position.

15. Apparatus as defined by claim 14 further including fourth means for restoring said locking member to said first locking position upon actuating movement of said actuating member.

16. Apparatus as defined by claim 14 wherein said third means is motor actuated.

17. Apparatus as defined by claim 16 wherein said third means operates intermittently.

References Cited

UNITED STATES PATENTS

| | | | |
|---|---|---|---|
| 1,813,473 | 7/1931 | Walker | 70—314 |
| 1,902,195 | 3/1933 | Swann | 70—270 X |
| 2,213,573 | 9/1940 | Von Pein et al. | 70—433 |
| 3,030,015 | 4/1962 | Wieslander et al. | 235—94 |
| 3,034,329 | 5/1962 | Pitney et al. | 70—314 |
| 3,055,549 | 9/1962 | McGaughey | 222—2 |
| 3,115,301 | 12/1963 | Renner | 239—94 X |

MARVIN A. CHAMPION, *Primary Examiner.*